US012677942B2

(12) United States Patent
Chen

(10) Patent No.: US 12,677,942 B2
(45) Date of Patent: Jul. 14, 2026

(54) FOLDABLE SUPPORT AND LOCKING STRUCTURE THEREOF

(71) Applicant: Suting Chen, Zhejiang (CN)

(72) Inventor: Suting Chen, Zhejiang (CN)

( * ) Notice: Subject to any disclaimer, the term of this patent is extended or adjusted under 35 U.S.C. 154(b) by 0 days.

(21) Appl. No.: 19/294,378

(22) Filed: Aug. 8, 2025

(65) Prior Publication Data

US 2026/0041236 A1      Feb. 12, 2026

(30) Foreign Application Priority Data

Aug. 9, 2024    (CN) .......................... 202421927286.3

(51) Int. Cl.
| *A47B 81/00* | (2006.01) |
| *A47B 45/00* | (2006.01) |
| *F16B 7/10* | (2006.01) |

(52) U.S. Cl.
CPC ............ *A47B 81/005* (2013.01); *A47B 45/00* (2013.01); *F16B 7/105* (2013.01)

(58) Field of Classification Search
CPC ....... A47B 81/005; A47B 45/00; F16B 7/105; F41A 23/06; F41A 23/16; F41A 23/56; F41A 23/18; F41B 5/1453
See application file for complete search history.

(56) References Cited

U.S. PATENT DOCUMENTS

| 3,012,350 | A | * | 12/1961 | Wold | ...................... | F41A 23/16 |
| | | | | | | 89/37.04 |
| 4,333,385 | A | * | 6/1982 | Culver | .................... | F41A 23/16 |
| | | | | | | 73/167 |

| 4,824,086 | A | * | 4/1989 | Rickling | ................. | F41A 23/00 |
| | | | | | | 269/275 |
| 5,081,783 | A | * | 1/1992 | Jarvis | ...................... | F41A 23/16 |
| | | | | | | 42/94 |
| 6,877,266 | B1 | * | 4/2005 | Brownlee | ............... | F41A 23/16 |
| | | | | | | 89/37.04 |
| 7,878,743 | B2 | * | 2/2011 | Aftanas | ..................... | B60P 7/15 |
| | | | | | | 410/104 |
| 7,997,021 | B2 | * | 8/2011 | Cauley | .................... | F41A 23/14 |
| | | | | | | 42/94 |
| 10,514,225 | B2 | * | 12/2019 | Cauley, Jr. | ............. | F41A 23/16 |
| 11,415,384 | B1 | * | 8/2022 | Dvorak | ................... | F41A 23/16 |
| 11,686,412 | B2 | * | 6/2023 | Oggier, III | ............. | F16B 7/182 |
| | | | | | | 403/243 |
| 11,933,569 | B1 | * | 3/2024 | Chernik | ................. | F16M 11/14 |
| 12,031,569 | B2 | * | 7/2024 | Moshammer | ....... | F16C 33/1075 |
| 12,280,486 | B2 | * | 4/2025 | Tata | ........................ | F16B 7/042 |
| 2004/0134113 | A1 | * | 7/2004 | Deros | ..................... | F41A 23/16 |
| | | | | | | 42/94 |
| 2009/0188146 | A1 | * | 7/2009 | Werner | ..................... | F41G 1/54 |
| | | | | | | 451/462 |

(Continued)

*Primary Examiner* — Ko H Chan

(74) *Attorney, Agent, or Firm* — Hawaii Patent Services; Nathaniel K. Fedde; Kenton N. Fedde

(57) ABSTRACT

The present disclosure provides a foldable support and a locking mechanism thereof. The foldable support comprises a connection assembly, a support assembly, and the locking mechanism. The support assembly comprises a main body, and the connection assembly comprises a first telescopic rod. The locking mechanism connects the support assembly and the connection assembly, comprising interconnected drive part and movable part. The movable part is detachably connected to the first telescopic rod and the main body.

19 Claims, 9 Drawing Sheets

(56) References Cited

U.S. PATENT DOCUMENTS

| | | | |
|---|---|---|---|
| 2013/0086835 A1* | 4/2013 | Minneman | F41A 23/16 |
| | | | 42/94 |
| 2020/0208933 A1* | 7/2020 | Wynalda, Jr. | F41A 23/06 |
| 2020/0263948 A1* | 8/2020 | Cauley, Jr. | F41A 23/16 |

* cited by examiner

420

400

410

FOLDABLE SUPPORT AND LOCKING STRUCTURE THEREOF

CROSS-REFERENCE TO RELATED APPLICATIONS

This application claims priority to Chinese Patent Application No. 202421927286.3, filed on Aug. 9, 2024, entitled "Locking Mechanism and Detachable Support," the content of which, including any amendments therein, is hereby incorporated by reference in its entirety.

TECHNICAL FIELD

The present disclosure relates to a detachable shooting support with a longer barrel, particularly to a locking mechanism of a support.

BACKGROUND

Firearms with longer barrels impose relatively higher demands on the stable support of shooting supports, so supports with only one support point may hardly meet such requirements. Supports with support points at two positions (front and rear) usually have non-adjustable spacing and cannot adapt to long-barreled firearms of different models. As disclosed in U.S. patent applications US20140360080A1 and US20230280123A1, both propose shooting rest assemblies. US20230280123A1 mainly includes a base and two support seats foldably arranged at both ends of the base, which provide good support stability, but the spacing between the two support seats is fixed and non-adjustable. US20140360080A1 mainly includes a base with at least one clip for connecting to the support. The platform is rotatably connected to the base and has a platform frame and a telescopic member telescopically connected to the platform frame.

However, the aforementioned shooting supports do not provide a satisfactory user experience, especially in terms of inconvenient adjustment of the support points at both ends, and the support points cannot be easily detached.

SUMMARY

The present disclosure proposes a foldable support and a locking mechanism thereof. The foldable support comprises a connection assembly comprising a first telescopic rod and a support assembly comprising a main body, and further comprises a locking mechanism for connecting the support assembly and the connection assembly.

The locking mechanism comprises a drive part and a movable part connected to each other, wherein the movable part is detachably connected to the first telescopic rod and the main body.

When the locking mechanism is in the locked state, the movable part prevents the first telescopic rod and the main body from axially disengaging from the movable part axially along the first telescopic rod, and the drive part prevents the movable part from disengaging from the first telescopic rod or the main body; and when the locking mechanism is in the unlocked state, the movable part disengages from the first telescopic rod and/or the main body.

BRIEF DESCRIPTION OF DRAWINGS

The drawings, which form a part of this application, are provided to further illustrate the present disclosure. The illustrative embodiments and descriptions thereof are intended to explain the present disclosure and do not constitute an undue limitation thereof. In the drawings.

REFERENCE SIGNS

Figure 1:
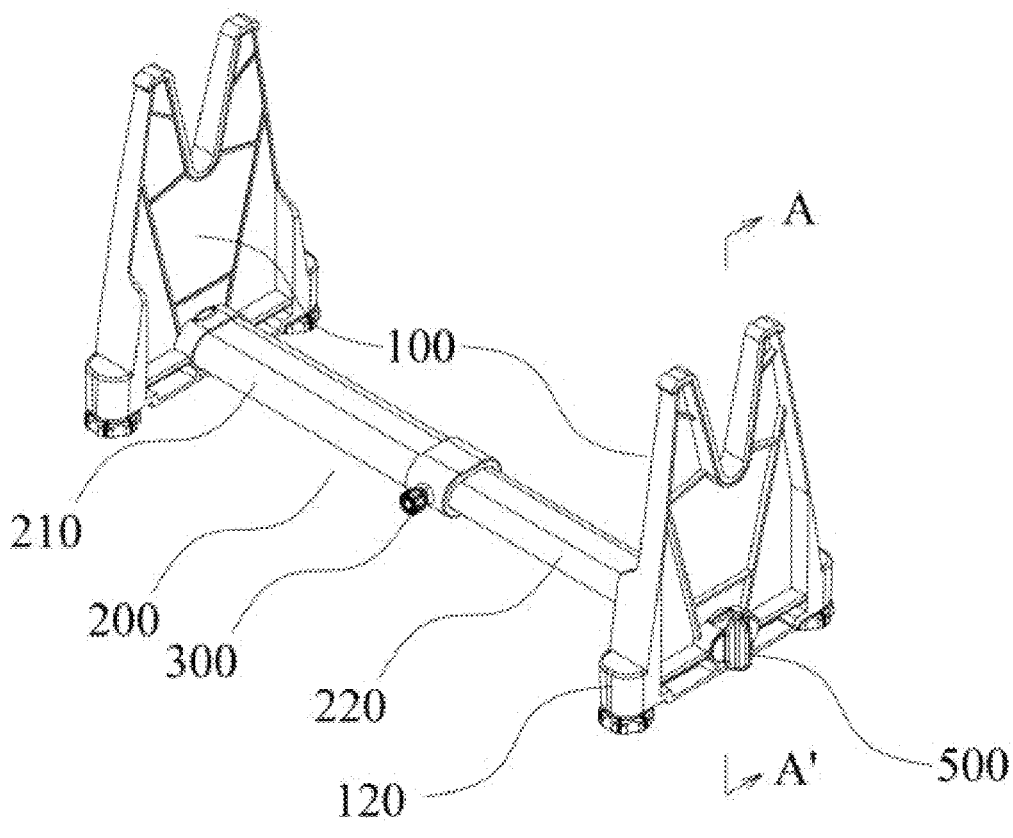
FIG. 1 is a schematic diagram of the overall structure of the detachable support according to the present disclosure.

Support assembly (100); Main body (110); Opening (111); Balance adjustment part (120); Internal thread (121); Nut (122); Buffer pad (130); Sleeve (140); Recess (141);

Connection assembly (200); First telescopic rod (210); First through hole (211); Second through hole (212); Second telescopic rod (220);

Telescopic control member (300);

End cap (400); Connection foot (410); Rotation channel (420);

Locking mechanism (500); Drive part (510); Movable part (520); Protrusion (521); Boss pin (522); Drive rod (530); Round rod (531); Eccentric rod (532).

DESCRIPTION OF EMBODIMENTS

The technical solution in the embodiment of the present disclosure will be clearly and completely described below with reference to the drawings. Obviously, the described embodiment is part of, rather than all of the embodiments of the present disclosure. The following description of at least one exemplary embodiment is illustrative in nature and is in no way intended to limit the present disclosure, its application or uses. Based on the embodiments in the present disclosure, all other embodiments obtained by those skilled in the art without creative work belong to the scope of protection of the present disclosure.

It should be noted that the terminology used here is only for describing specific embodiments, and is not intended to limit exemplary embodiments according to the present application. As used herein, the singular form is also intended to include the plural form unless the context clearly indicates otherwise. Furthermore, it should be appreciated that when the terms "comprising" and/or "including" are used in this specification, they specify the presence of features, steps, operations, devices, components and/or combinations thereof.

Unless otherwise specified, the relative arrangement of components and steps, numerical expressions and numerical values set forth in these embodiments do not limit the scope of the present disclosure. At the same time, it should be appreciated that for the convenience of description, the dimensions of various parts shown in the drawings are not drawn according to the actual scale relationship. Techniques, methods and equipment known to those skilled in the art may not be discussed in detail, but in appropriate cases, they should be regarded as part of the authorization specification. In all the examples shown and discussed herein, any specific values should be interpreted as illustrative, and not as limiting. Therefore, other examples of exemplary embodiments may have different values. It should be noted that similar numbers and letters indicate similar items in the following drawings, therefore once an item is defined in one drawing, it does not need to be further discussed in subsequent drawings.

Figure 2:
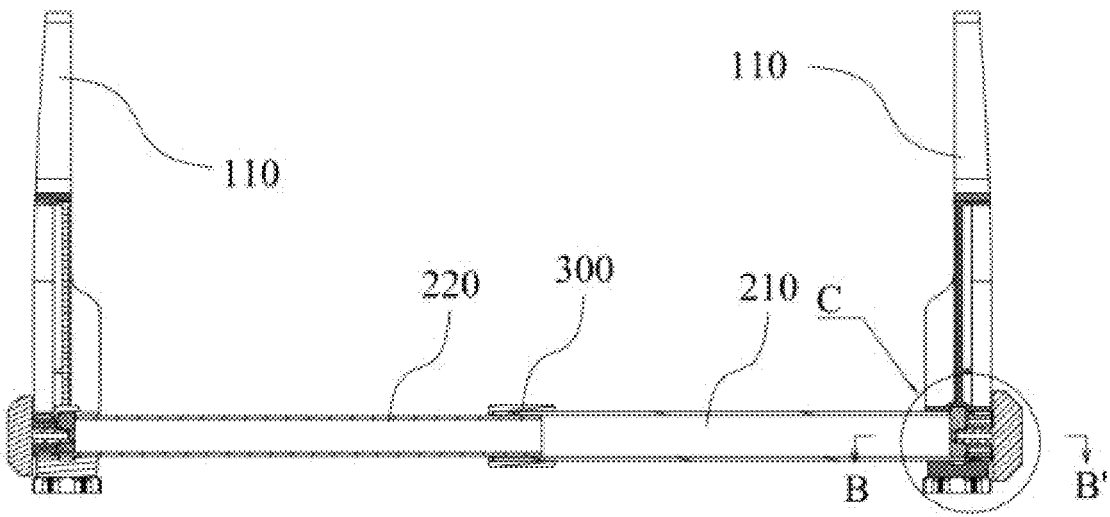
FIG. 2 is a cross-sectional view of the detachable support taken along line A-A' of the vertical centerline of the main body.

Referring to FIGS. 1-6, the detachable support of the present disclosure includes a support assembly 100 and a connection assembly 200, which are detachably connected. As shown in FIGS. 1 and 2, in an embodiment, two support assemblies 100 are detachably connected to the two ends of the connection assembly 200 respectively. The connection assembly 200 includes a first telescopic rod 210 and a second telescopic rod 220 that are telescopically connected, with their telescopic state controlled by a telescopic control member 300. The telescopic control member 300 may be a common control member such as a knob, button, or buckle, the specific form of which will not be elaborated further. The first connecting end of the first telescopic rod 210 is detachably connected to one support assembly 100, while the second connecting end of the second telescopic rod 220 is detachably connected to another support assembly 100.

In one embodiment, the first telescopic rod 210 and the second telescopic rod 220 are coaxially and slidably connected, with the second telescopic rod 220 sleeved inside the first telescopic rod 210. In other embodiments, the first telescopic rod 210 and the second telescopic rod 220 may also be slidably connected in other ways, such as non-coaxial sliding, the specific implementation of which will not be elaborated further. The connection assembly 200 features telescopic functionality, allowing the adjustment of the support base spacing as needed, with simple operation, thereby addressing the issue of cumbersome adjustments required for existing telescopic supports after length modification.

Figure 4:
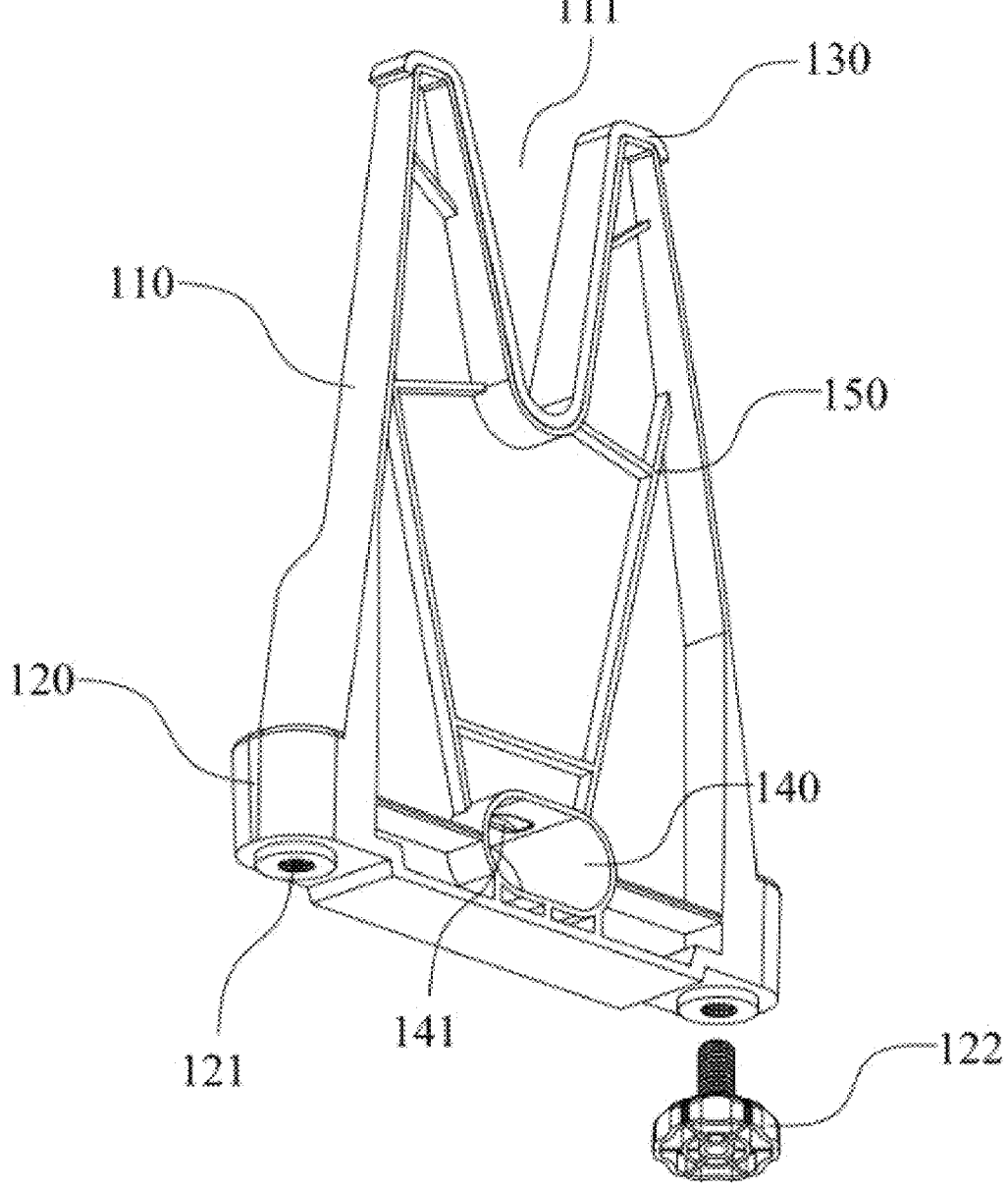
FIG. 4 is an exploded schematic diagram of the support assembly of the detachable support according to the present disclosure.
Figure 5:
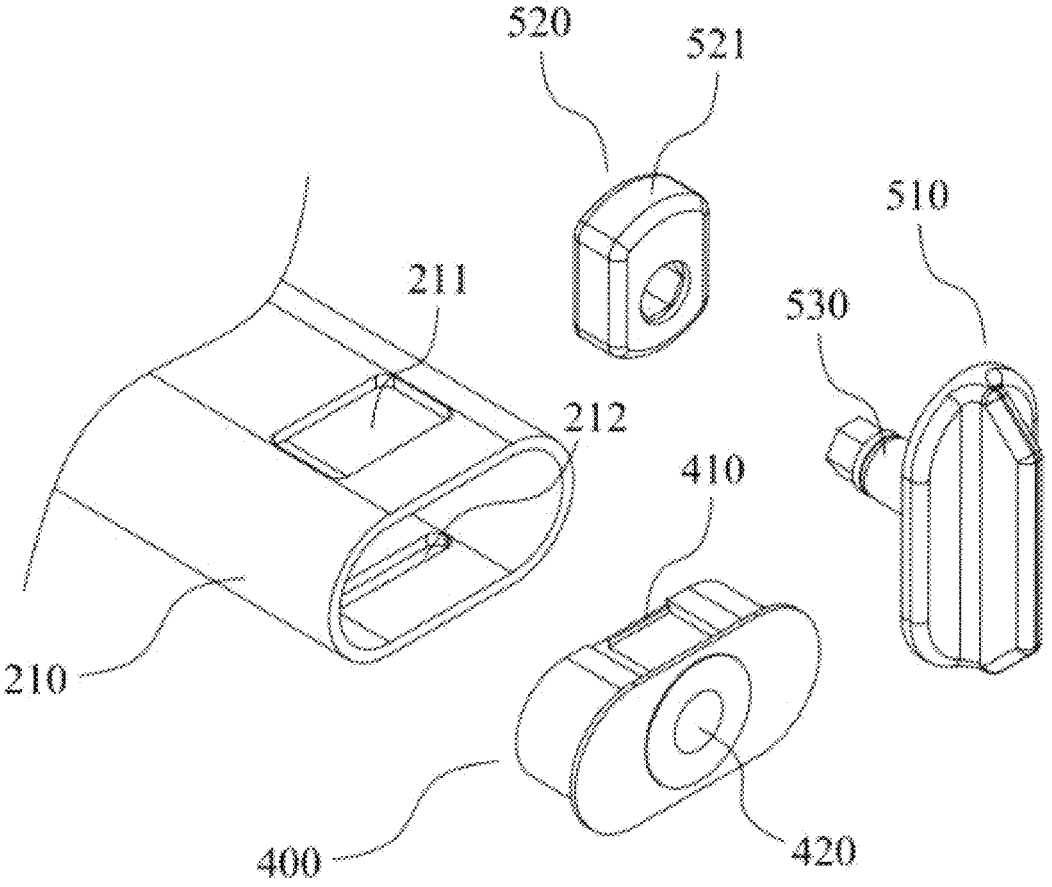
FIG. 5 is an exploded schematic diagram of the connection assembly and locking mechanism of the detachable support according to the present disclosure.
Figure 6:
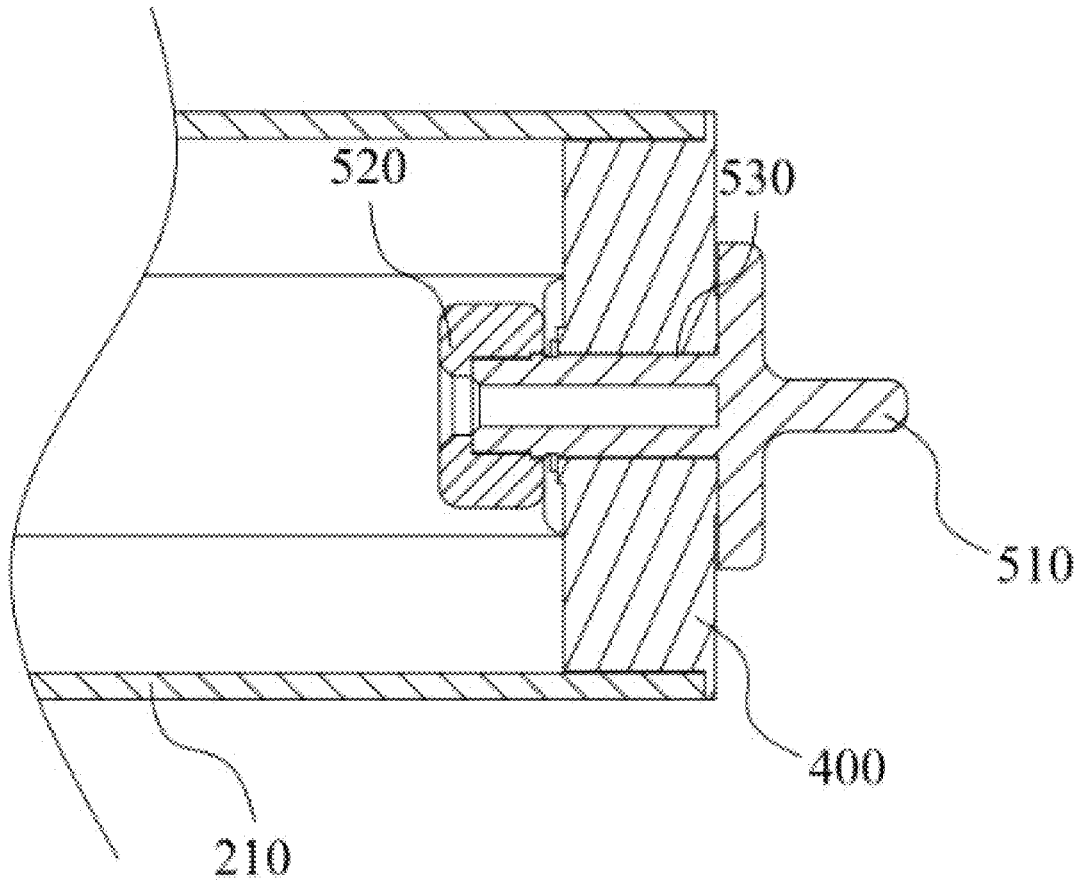
FIG. 6 is a cross-sectional view taken along line B-B' in FIG. 2.

The support assembly 100 includes a main body 110 and an opening 111 located on the upper part of the main body 110, designed to support the middle and lower sections of a gun barrel. The openings 111 of the two support assemblies 100, positioned front and back, provide more stable support for the gun barrel. The main body 110 is symmetrically structured along the vertical midline, as shown in FIGS. 4-6, with the opening 111 also symmetrical along the vertical midline. The width of the upper part of the opening 111 is greater than or equal to the width of its bottom, and the minimum width of the opening 111 exceeds the width of the gun barrel. The opening 111 may be U-shaped or V-shaped, or any other shape that meets the opening conditions of the present disclosure. The shape of the opening 111 can be customized for different types of gun barrels, such as circular, oval, or polygonal, to enhance adaptability. As shown in FIG. 4, in one embodiment, a buffer pad 130 is provided at the edge of the opening 111, which not only increases the friction between the gun barrel and the edge of the opening 111 to improve the stability of the gun barrel support but also reduces the impact and wear on the edge of the opening 111 when placing the gun barrel. In one embodiment, the buffer pad 130 is made of rubber.

The support assembly 100 further includes a balance adjustment part 120 located at the lower portion of the main body 110. In one embodiment, the balance adjustment part 120 is symmetrically arranged on both sides of the lower portion of the main body 110 and can adjust the height of the corresponding position of the main body 110 within a certain range. In one embodiment, the balance adjustment part 120 has an internal thread 121 and a nut 122. The axis of the internal thread 121 extends vertically, parallel to the centerline of the main body 110. The nut 122 has an external thread that matches the internal thread 121. When the nut 122 is rotated, the height of the corresponding side of the main body 110 can be adjusted. In other embodiments, the balance adjustment part 120 may also be other structures capable of manually or automatically adjusting the height of the main body 110.

The connection assembly 200 is connected to the support assembly 100 through a locking mechanism 500. The locking mechanism 500 has a locked state and an unlocked state. When in the locked state, the connection assembly 200 and the support assembly 100 remain stably connected. When in the unlocked state, the connection assembly 200 and the support assembly 100 are detachable.

The support assembly 100 is detachably connected to the connection assembly 200, enabling quick and stable assembly during use and rapid disassembly for easy storage when not in use. This solves the problem of existing supports being unstable and prone to dislocation.

The locking mechanism 500 includes a drive part 510 and a movable part 520 connected to the drive part 510. The drive part 510 can be a knob, button, lever, or other common control component, used to switch the movable part 520 between the locked and unlocked states. In one embodiment, taking the first connecting end of the first telescopic rod 210 as an example, the first connecting end allows the movable part 520 to freely enter and exit the interior of the first telescopic rod 210 in the unlocked state. The first connecting end has a first through hole 211, which permits the protrusion 521 of the movable part 520 to extend from the interior of the first telescopic rod 210 through the first through hole 211 in the locked state. The protrusion 521 prevents the first connecting end of the first telescopic rod 210 from axially disengaging from the movable part 520, meaning the first telescopic rod 210 is locked by the protrusion 521.

The locking mechanism has a simple structure, consisting only of the interconnected drive part 510 and movable part 520. It is easy to operate and provides ideal locking performance, solving the problems of existing support locking mechanisms being structurally complex, inconvenient to operate, and having unsatisfactory locking effects.

Figure 3:
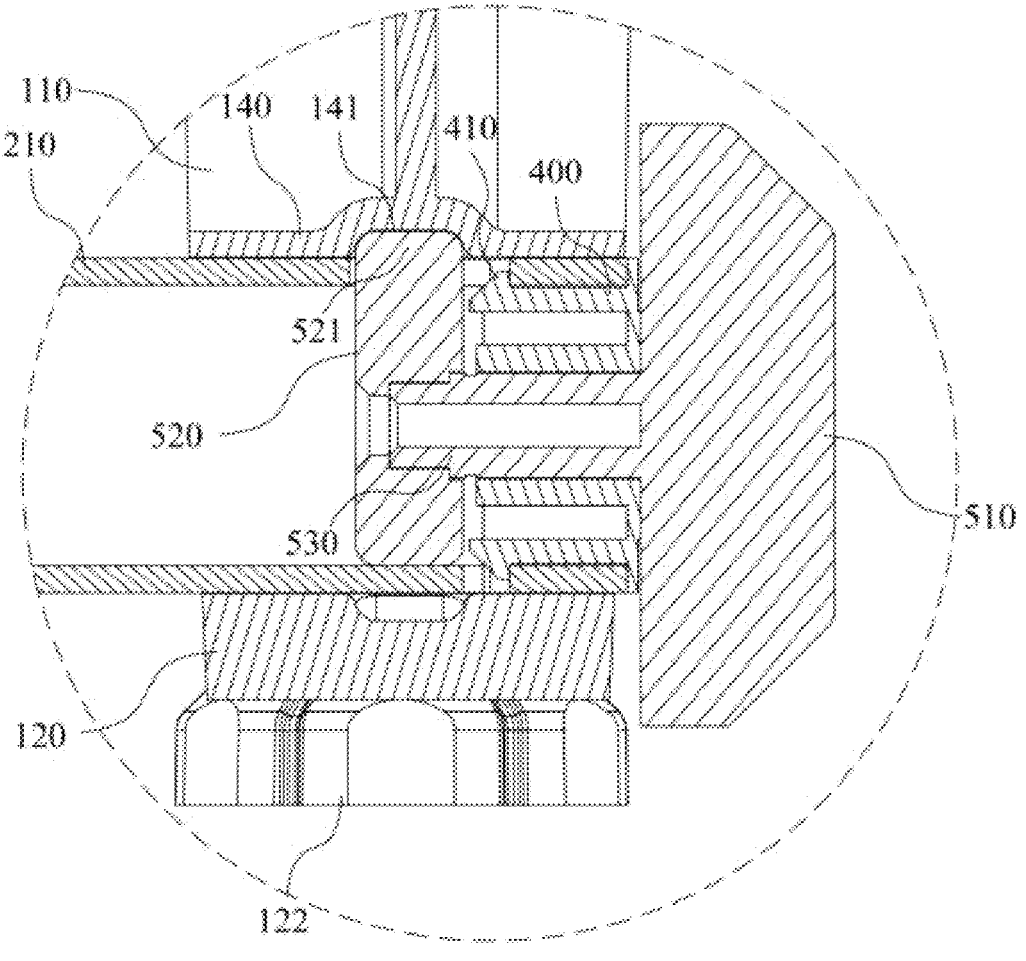
FIG. 3 is an enlarged view of section C in FIG. 2.

As shown in FIGS. 3 and 4, the lower part of the main body 110 has a main body connection point, where the connection assembly 200 is connected to the support assembly 100. In one embodiment, the main body connection point is a sleeve 140 penetrating the main body 110, and the sleeve 140 has a positioning part inside. In one embodiment, the positioning part is a recess 141. In the embodiment where the positioning part is a recess 141, the movable part 520 has a protrusion 521. When the protrusion 521 enters the recess 141, it prevents the main body 110 from disengaging axially from the movable part 520, meaning the main body 110 is locked by the protrusion 521. Based on the recess 141 and protrusion 521, those skilled in the art can further incorporate corresponding guiding or sliding structures to enhance the locking effect and ease of unlocking. For example, a groove can be added to the surface of the recess 141, while a matching bump can be set on the surface of the protrusion 521. In one embodiment, the movable part 520 rotates to allow the protrusion 521 to enter or exit the recess 141. Here, the drive part 510 can be a knob, and the drive part 510 prevents the movable part 520 from disengaging axially from the main body connection point or the first connecting end, as shown in FIG. 5. In another embodiment, the movable part 520 moves linearly to allow the protrusion 521 to enter or exit the recess 141. Here, the drive part 510 can be a button with a reset function, and the drive part 510 prevents the movable part 520 from disengaging radially from the main body connection point or the first connecting end. In one embodiment, the movable part 520 can use spring force to automatically lock by driving the protrusion 521 into the recess 141. The drive part 510 can be a push-button, where pressing it compresses the spring, causing the protrusion 521 to exit the recess 141 for unlocking. Alternatively, the movable part 520 and recess 141 can be made of magnetic materials, enabling locking and unlocking through magnetic force. The drive part 510 can also be a knob, where rotation changes the magnetic field direction, causing the protrusion 521 to attract or separate from the recess 141.

In one embodiment, the first connecting end of the first telescopic rod 210 is sleeved inside the sleeve 140, and the locking mechanism 500 is rotatably connected to the first connecting end of the first telescopic rod 210 through the end cap 400. Specifically, the end cap 400 is connected to the first connecting end of the first telescopic rod 210. In one embodiment, the first connecting end has a second through hole 212, and the connection foot 410 of the end cap 400 enters the interior of the second through hole 212 and is hooked onto the edge of the second through hole 212. In one embodiment, the connection feet 410 are symmetrically arranged in pairs, both hooked onto the edge of the symmetrically arranged first through hole 211 and second through hole 212, thereby fixedly connecting the end cap 400 to the first connecting end. The end cap 400 has a rotation channel 420 extending axially along the first telescopic rod 210, and the locking mechanism 500 rotates within the rotation channel 420. For example, the drive part 510 is fixedly connected to the movable part 520 through the drive rod 530. When the drive part 510 is rotated, the drive rod 530 rotates within the rotation channel 420, driving the movable part 520 to rotate simultaneously. That is, the movable part 520 switches between the locked state and the unlocked state by rotating. In another embodiment, the end cap 400 is fixedly connected to the sleeve 140. In one embodiment, the end cap 400 can be equipped with multiple connection feet 410 and multiple second through holes 212 to achieve multi-point locking, enhancing connection stability and safety. Alternatively, the end cap 400 can be designed as a quick-release structure, such as using buckles or quick-release buttons, allowing users to quickly install and remove the first telescopic rod 210, improving ease of use.

In another embodiment, the first connecting end of the first telescopic rod 210 can also be sleeved outside the sleeve 140. In this case, the positioning part of the sleeve 140 is a positioning through hole (not shown). When the protrusion 521 of the movable part 520 extends out of the positioning through hole and the first through hole 211, it simultaneously prevents the sleeve 140 and the first connecting end of the first telescopic rod 210 from axially disengaging from the movable part 520. When the protrusion 521 of the movable part 520 exits the positioning through hole and/or the first through hole 211, the sleeve 140 and the first connecting end of the first telescopic rod 210 are released from the constrained state imposed by the protrusion 521. In one embodiment, the sleeve 140 can have multiple positioning through holes, and the movable part 520 can have multiple protrusions 521, achieving higher stability and safety through multi-layer locking. Alternatively, the movable part 520 can be designed as a quick-release structure, such as a spring-loaded quick-release button, enabling users to quickly disengage the lock, improving operational convenience.

Figure 7:
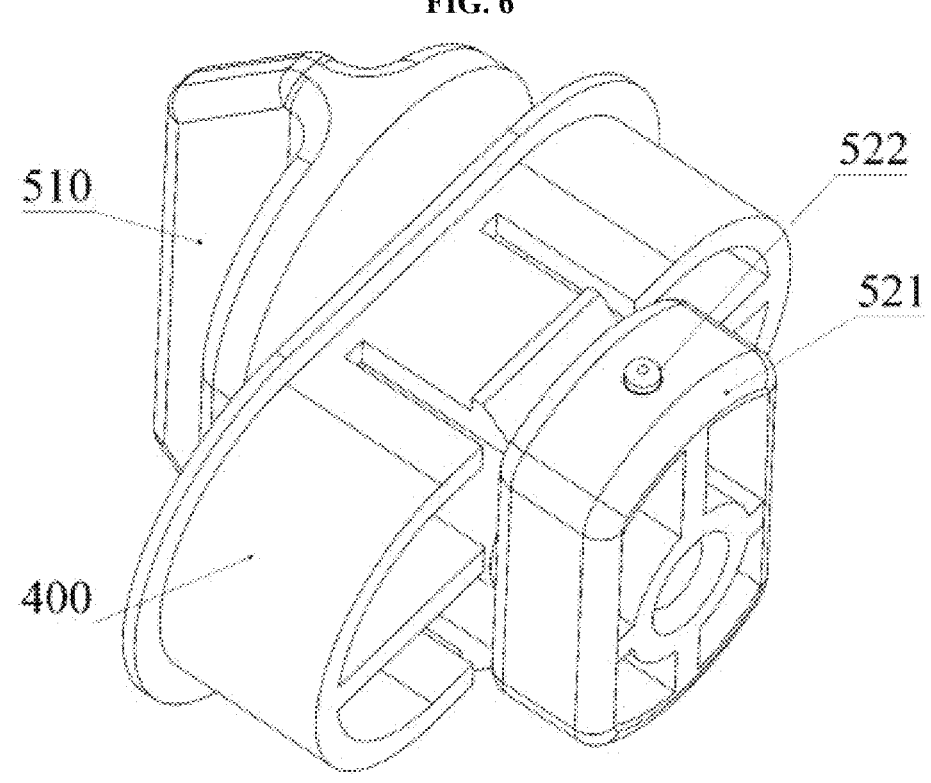
FIG. 7 is a schematic diagram of the boss pin structure of the detachable support.
Figure 8:
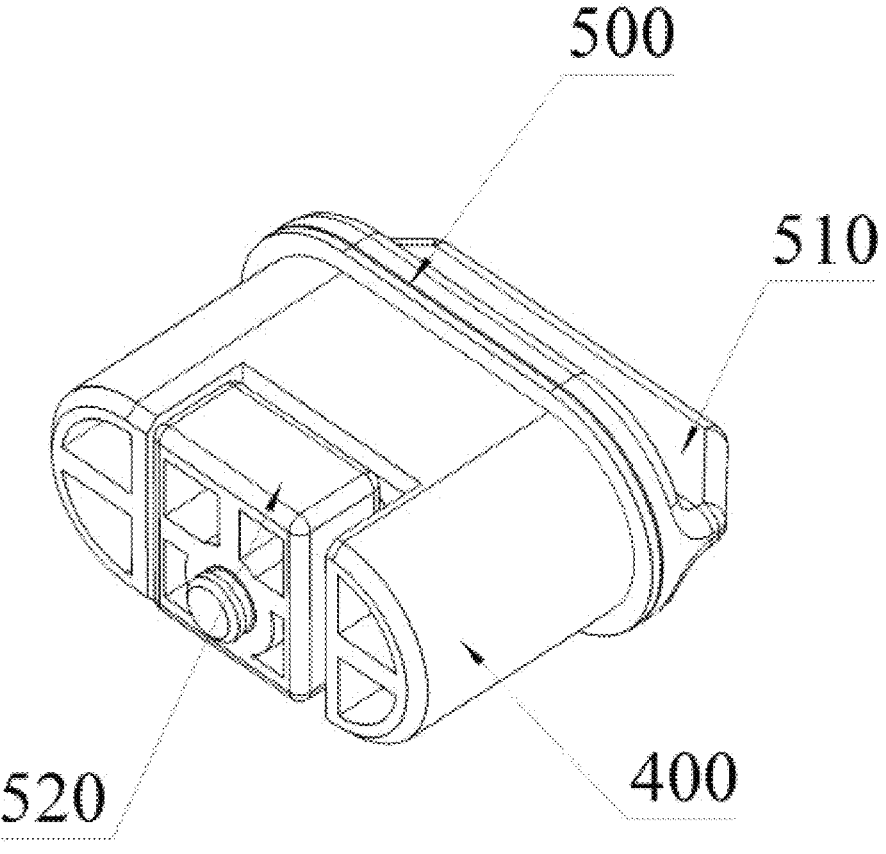
FIG. 8 is a schematic diagram of another embodiment of the locking mechanism according to the present disclosure.
Figure 9:
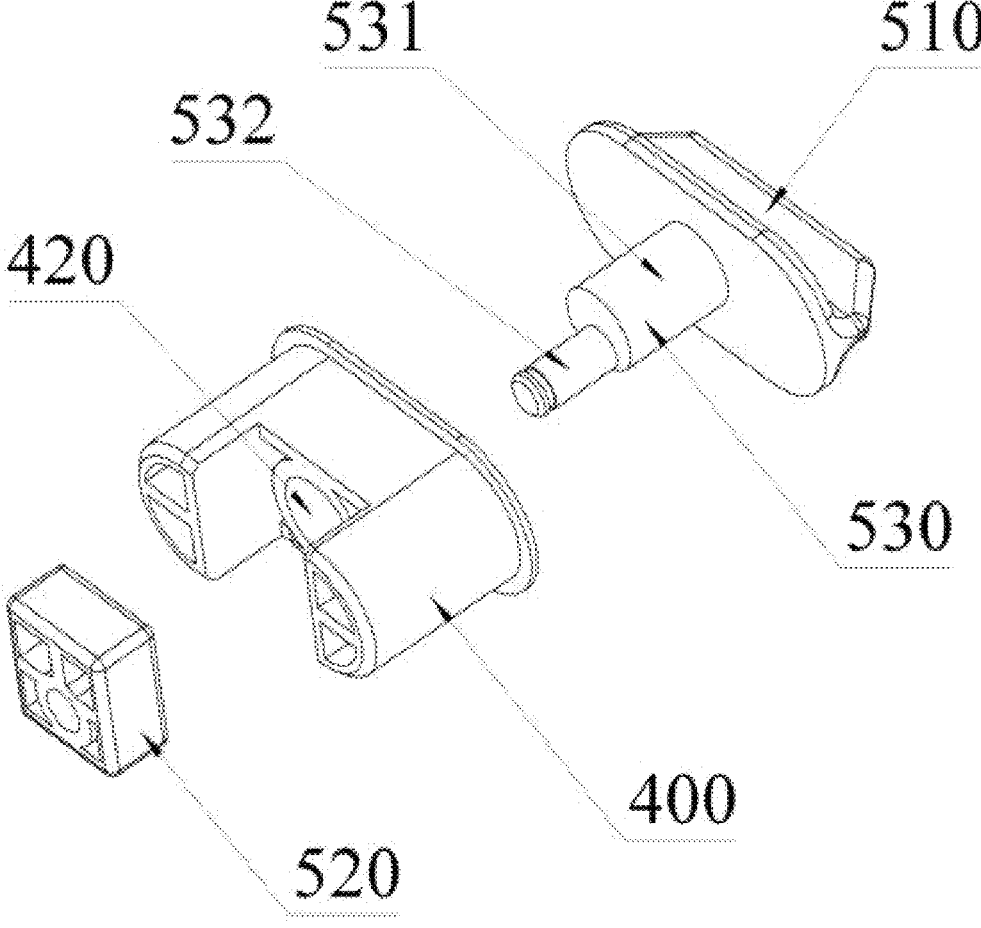
FIG. 9 is an exploded schematic diagram of the locking mechanism in FIG. 8.
Figure 10:
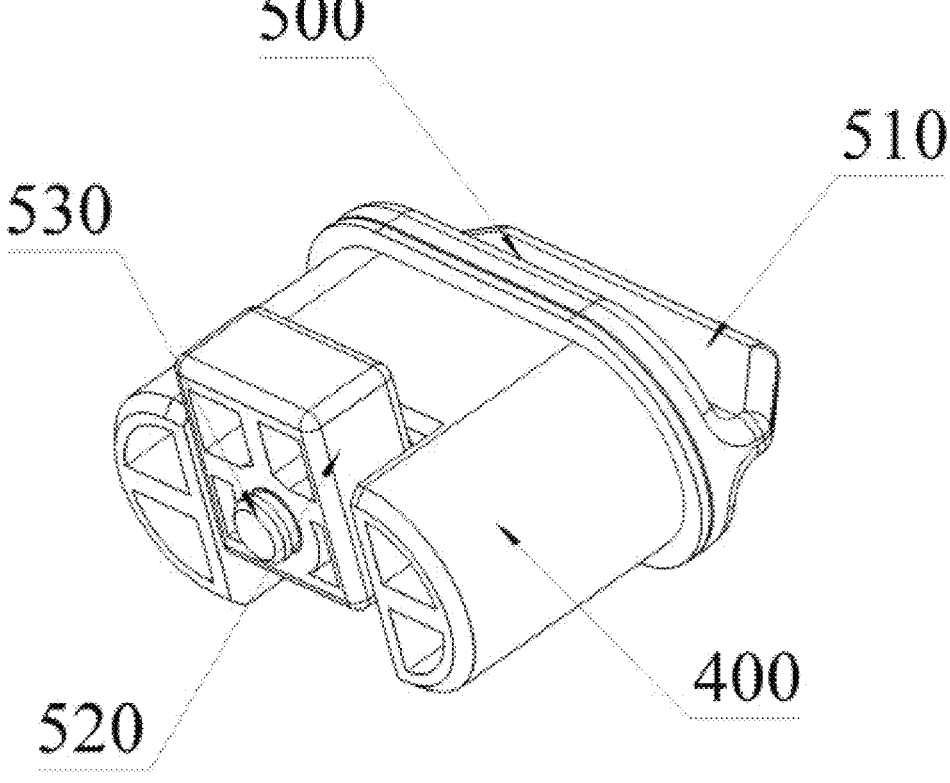
FIG. 10 is a schematic diagram of the working state of the locking mechanism in FIG. 8.
Figure 11:
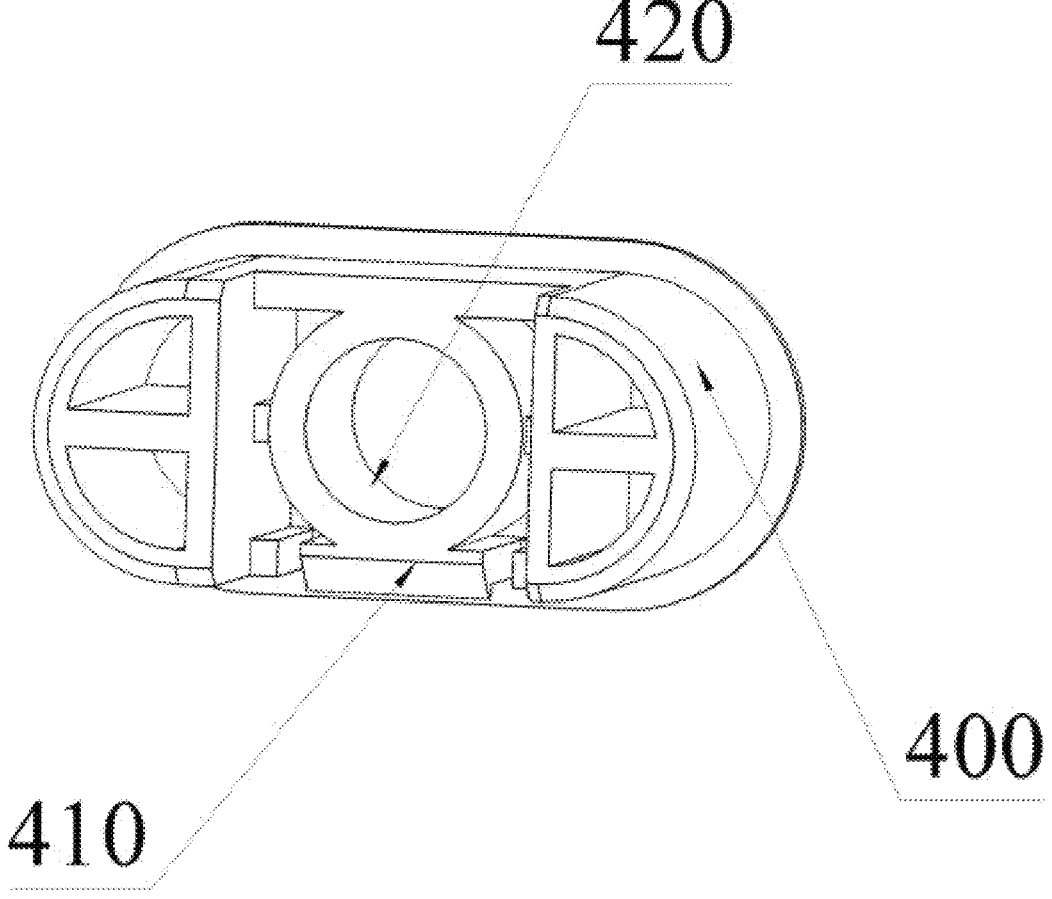
FIG. 11 is a schematic diagram of the end cap, the connection foot and the rotation channel in FIG. 8.

In the existing locking mechanism 500, since the engagement between the protrusion 521 and the positioning part is prone to accidental disconnection due to vibration or external force, and long-term use may cause wear on the contact surface, thereby affecting locking reliability, in some embodiments, as shown in FIG. 7, a boss pin 522 is provided at the top of the protrusion 521 of the movable part 520. This boss pin 522 can be embedded into the positioning part of the sleeve 140 of the main body 110 in the locked state, thereby enhancing connection stability, while automatically disengaging from the positioning part in the unlocked state to allow free movement of the movable part 520. Meanwhile, one or more slots can be arranged in the recess 141 to cooperate with the boss pin 522 along its motion trajectory, providing better positioning effects and tactile feedback.

Furthermore, to further improve the vibration and impact resistance of the overall locking mechanism 500, boss pins 522 of different shapes or materials can be adopted, a spring-biased structure can be introduced to achieve automatic engagement, or the positioning part can be structurally optimized and surface-hardened to effectively prevent accidental separation between components under external impact or vibration, thereby significantly enhancing the safety and stability of the detachable support in practical use.

In some embodiments (not shown), the boss pin 522 adopts a conical, wedge-shaped, or spherical design, matching slots with corresponding taper/curvature, and incorporates elastic elements (such as springs or silicone pads) inside the pin, or the boss pin 522 itself is made of elastic material (such as nylon or polyurethane), compensating for assembly gaps through elastic deformation and absorbing impact energy in the locked state. Alternatively, a permanent magnet can be embedded at the end of the boss pin 522, while magnetic conductive material (such as ferrite sheets) is placed at the bottom of the slot, utilizing magnetic attraction to assist the boss pin 522 in rapid alignment and maintaining the embedded state to some extent.

In some embodiments, the first connecting end of the first telescopic rod 210 and the main body connection point are alternatively secured by the locking mechanism 500. For example, the locking mechanism 500 includes an insertion groove on the main body connection point, and the outer edge of the first connecting end can be engaged with the insertion groove. When the outer edge of the first connecting end is inserted into the groove, the first telescopic rod 210 is connected to the main body 110, though such a connection may lack stability. Further, when the first connecting end approaches or contacts the solid portion of the main body connection point, the movable part 520 of the locking mechanism 500 is a pin. Both the first connecting end and the solid portion of the main body connection point feature connection holes (not shown) that allow the pin to pass through, while the drive part 510 of the locking mechanism 500 is blocked from passing through. In this state, the first connecting end and the solid portion of the main body connection point are pinned together. That is, the movable part 520 switches between the locked state and the unlocked state through linear motion. In one embodiment, the locking mechanism 500 may adopt a buckle design, where the outer edge of the first connecting end is engaged with a buckle on the main body connection point, achieving locking and unlocking through elastic deformation of the buckle, offering simplicity and high stability. Alternatively, in another embodiment, the locking mechanism 500 may use a threaded design, where the outer edge of the first connecting end threads into the main body connection point, enabling locking and unlocking by rotating the first connecting end, providing firm and easy-to-operate connections.

The movable part 520 is detachably connected to the first telescopic rod 210 and the main body 110. In the locked state, the movable part 520 prevents the first telescopic rod 210 and the main body 110 from disengaging axially along the first telescopic rod 210, while the drive part 510 prevents the movable part 520 from detaching from the first telescopic rod 210 or the main body 110. This ensures stable locking, minimizes accidental misoperation that could cause unintended support displacement, and addresses the issue of insufficient stability in existing telescopic support locking mechanisms.

In one embodiment, the cross-section of the first telescopic rod 210 is non-circular. As shown in FIGS. 4 and 5, the cross-section is oblong; in other embodiments, it may be elliptical, square, or another non-circular shape.

In one embodiment, the main body 110 includes reinforcing ribs 150 to enhance its strength. In one example, the reinforcing ribs 150 are symmetrically arranged along the vertical midline of the main body 110.

The support assembly and the connection assembly are detachably connected, enabling quick and stable assembly during use and easy disassembly and storage when not in use. The connection assembly features telescopic functionality, making it suitable for firearms with barrels of varying lengths. The locking component has a simple structure for easy installation.

In other embodiments (as shown in FIGS. 8 to 11), the drive rod 530 consists of a round rod 531 and an eccentric rod 532. One end of the round rod 531 is fixed to the drive part 510, while the other end is fixed to the eccentric rod 532. The axes of the round rod 531 and the eccentric rod 532 are parallel but offset (non-coincident). The round rod 531 is rotationally mounted in the rotation channel 420. When the drive part 510 is rotated, it drives the round rod 531 and the eccentric rod 532 to rotate synchronously. One end of the movable part 520 is provided with a mounting hole, and the eccentric rod 532 is positioned within this mounting hole. The rotation of the eccentric rod 532 drives the movable part 520 to move. The movable part 520 has a cuboid structure, and there is a gap between the outer side of the movable part 520 and the inner wall of the end cap 400, allowing unrestricted movement of the movable part 520. When securing the support assembly 100 and the connection assembly 200, the end cap 400 is inserted into the connection assembly 200, with the connection foot 410 of the end cap 400 entering the interior of the second through hole 212 and hooked onto its edge. At this point, the drive part 510 is rotated to allow the round rod 531 to rotate within the rotation channel 420, driving the eccentric rod 532 to rotate upward. During this rotation, the eccentric rod 532 moves the movable part 520 upward, causing the movable part 520 to be engaged within the recess 141, thereby securing the support assembly 100 and the connection assembly 200 in place.

In the description of the present disclosure, it should be appreciated that directional terms such as "front, rear, up, down, left, right", "horizontal, vertical, perpendicular, horizontal" and "top, bottom" etc. indicate the orientation or positional relationship based on the orientation or positional relationship shown in the drawings, and are only for the convenience of describing the present disclosure and simplifying the description. In the absence of a contrary explanation, these directional terms do not indicate or imply that the device or element referred to must have a specific orientation or be constructed and operated in a specific orientation, and therefore should not be understood as limiting the scope of protection of the present disclosure; the directional terms "inside, outside" refer to the inside and outside relative to the contour of each component itself.

For the convenience of description, spatial relative terms such as "on . . . ", "above . . . ", "on the upper surface of . . . ", "upper" etc. may be used here to describe the spatial positional relationship of a device or feature with other devices or features as shown in the drawings. It should be appreciated that spatial relative terms are intended to encompass different orientations of the device in use or operation other than the orientation described in the drawings. For example, if the device in the drawing is inverted, the device described as "above other devices or structures" or "on other devices or structures" will subsequently be positioned as "below other devices or structures" or "under other devices or structures". Thus, the exemplary term "above" can include both "above" and "below" orientations. The device can also be positioned in other different ways (rotated 90 degrees or in other orientations), and the spatial relative descriptions used here should be interpreted accordingly.

In addition, it should be noted that the use of terms such as "first", "second" etc. to define components is for the convenience of distinguishing the corresponding components. Unless otherwise stated, the above terms have no special meaning, and therefore should not be understood as limiting the scope of protection of the present disclosure.

The above description is only a preferred embodiment of the present disclosure and is not intended to limit the present disclosure. For those skilled in the art, the present disclosure can have various modifications and changes. Any modifications, equivalent replacements, improvements etc. made within the spirit and principles of the present disclosure should be included within the scope of protection of the present disclosure.

What is claimed is:

1. A locking mechanism for connecting a connection assembly and a support assembly of a detachable support, the support assembly comprising a main body provided with a sleeve having a positioning part, and the connection assembly comprising a first telescopic rod, wherein:

the locking mechanism comprises a drive part and a movable part connected to each other, the movable part has a protrusion, wherein the movable part is detachably connected to the first telescopic rod and the main body;

wherein the locking mechanism has a locked state and an unlocked state:

in the locked state, the movable part prevents the first telescopic rod and the main body from axially disengaging from the movable part along the first telescopic rod, and the drive part prevents the movable part from disengaging from the first telescopic rod or the main body; and in the unlocked state, the movable part disengages from the first telescopic rod and/or the main body;

wherein a top of the protrusion of the movable part is provided with a boss pin, the boss pin being configured to:

in the locked state, be embedded into the positioning part of the sleeve of the main body to enhance engagement stability;

in the unlocked state, disengage from the positioning part to allow movement of the movable part.

2. The locking mechanism according to claim 1, further comprising a drive rod and an end cap, the drive part being fixedly connected to the movable part through the drive rod, and the end cap being provided with a rotation channel, wherein the drive rod rotates within the rotation channel of the end cap.

3. The locking mechanism according to claim 2, wherein a first connecting end of the first telescopic rod is fixedly connected to the end cap, and the rotation channel of the end cap extends axially along the first telescopic rod.

4. The locking mechanism according to claim 2, wherein a first connecting end of the first telescopic rod has a first through hole, wherein in the locked state, the protrusion extends out of the first through hole.

5. The locking mechanism according to claim 4, wherein the positioning part corresponds to the first through hole, and in the locked state, the protrusion is engaged with the positioning part, and the positioning part prevents the movable part from disengaging from the main body.

6. The locking mechanism according to claim 5, wherein the sleeve has a positioning through hole, and in the locked state, the protrusion of the movable part extends out of the first through hole and the positioning through hole.

7. The locking mechanism according to claim 2, wherein the sleeve is fixedly connected to the end cap, and the rotation channel of the end cap extends axially along the sleeve.

8. The locking mechanism according to claim 7, wherein a first connecting end of the first telescopic rod has a first through hole, the sleeve has a positioning through hole; and in the locked state, the protrusion of the movable part extends out from the first through hole and the positioning through hole.

9. The locking mechanism according to claim 1, wherein the movable part switches between the locked state and the unlocked state by a linear movement; and the movable part is a pin and a first connecting end of the first telescopic rod is pivotally connected to the sleeve through the pin.

10. The locking mechanism according to claim 1, wherein a cross-section of the first telescopic rod is non-circular.

11. The locking mechanism according to claim 1, wherein the connection assembly comprises the first telescopic rod and a second telescopic rod with telescoping functions, as well as a telescopic control member for controlling a telescoping state thereof, wherein a first connecting end of the first telescopic rod is detachably connected to a connecting end of the support assembly, a second connecting end of the second telescopic rod is detachably connected to another support assembly, and the telescopic control member is one of a knob, button, or buckle, thereby simplifying operations and enabling convenient adjustment of a spacing between the support assemblies.

12. The locking mechanism according to claim 1, wherein the support assembly further comprises a balance adjustment part located at a lower portion of the main body;

the balance adjustment part comprises an internal thread and a matching nut, an axis of the internal thread extends vertically and is parallel to a central line of the main body, and a height of a corresponding side of the main body is adjusted by rotating the matching nut.

13. A detachable support, comprising a connection assembly comprising a first telescopic rod and a support assembly comprising a main body, and further comprising a locking mechanism for connecting the support assembly and the connection assembly, wherein:

the locking mechanism comprises a drive part and a movable part connected to each other, wherein the movable part is detachably connected to the first telescopic rod and the main body, wherein the locking mechanism has a locked state and an unlocked state:

in the locked state, the movable part prevents the first telescopic rod and the main body from axially disengaging from the movable part axially along the first telescopic rod, and the drive part prevents the movable part from disengaging from the first telescopic rod or the main body; and in the unlocked state, the movable part disengages from the first telescopic rod and/or the main body;

wherein the support assembly further comprises a balance adjustment part disposed at a lower portion of the main body; and the balance adjustment part comprises an internal thread and a matching nut, an axis of the internal thread extends vertically and is parallel to a central line of the main body, and a height of a corresponding side of the main body is adjusted by rotating the matching nut.

14. The detachable support according to claim 13, further comprising a drive rod and an end cap, the drive part being fixedly connected to the movable part through the drive rod, and a rotation channel being provided in the end cap, wherein the drive rod is rotatably arranged within the rotation channel of the end cap, a first connecting end of the first telescopic rod is fixedly connected to the end cap, and the rotation channel of the end cap extends axially along the first telescopic rod.

15. The detachable support according to claim 14, wherein the first connecting end of the first telescopic rod has a first through hole, the movable part has a protrusion, and in the locked state, the protrusion extends out from the first through hole; and the main body is provided with a sleeve, the sleeve has a positioning part corresponding to the first through hole, and in the locked state, the protrusion is engaged with the positioning part, and the positioning part prevents the movable part from disengaging from the main body;

wherein the sleeve has a positioning through hole, in the locked state, the protrusion of the movable part extends out from the first through hole and the positioning through hole.

16. The detachable support according to claim 15, wherein the sleeve is fixedly connected to the end cap, and the rotation channel of the end cap extends axially along the sleeve; and the positioning part comprises a recess provided on the sleeve, the movable part comprises a cam that rotates with the drive part, a protruding portion of the cam constitutes the protrusion; and a groove is provided on a surface of the recess adjacent to the cam, and in the locked state, the cam extends out from the first through hole into the groove to prevent the main body from disengaging axially along the first telescopic rod.

17. The detachable support according to claim 16, wherein a top of the protrusion of the movable part is provided with a boss pin, the boss pin being configured to:

in the locked state, be embedded into the positioning part of the sleeve of the main body to enhance engagement stability;

in the unlocked state, disengage from the positioning part to allow movement of the movable part.

18. The detachable support according to claim 13, wherein: the connection assembly comprises the first telescopic rod and a second telescopic rod with telescoping functionality, and a telescopic control member for controlling their telescoping state;

wherein, a first connecting end of the first telescopic rod is detachably connected to a connecting end of the support assembly, a second connecting end of the second telescopic rod is detachably connected to another support assembly, the telescopic control member is one of a knob, button, or buckle, used to simplify operation and enable convenient adjustment of a spacing between the support assemblies.

19. A detachable support, comprising a connection assembly comprising a first telescopic rod and a support assembly comprising a main body, and further comprising a locking mechanism for connecting the support assembly and the connection assembly, wherein:

the locking mechanism comprises a drive part and a movable part connected to each other, wherein the movable part is detachably connected to the first telescopic rod and the main body, wherein the locking mechanism has a locked state and an unlocked state:

in the locked state, the movable part prevents the first telescopic rod and the main body from axially disengaging from the movable part axially along the first telescopic rod, and the drive part prevents the movable part from disengaging from the first telescopic rod or the main body; and in the unlocked state, the movable part disengages from the first telescopic rod and/or the main body;

further comprising a drive rod and an end cap, the drive part being fixedly connected to the movable part through the drive rod, and a rotation channel being provided in the end cap, wherein the drive rod is rotatably arranged within the rotation channel of the end cap, a first connecting end of the first telescopic rod is fixedly connected to the end cap, and the rotation channel of the end cap extends axially along the first telescopic rod;

wherein the first connecting end of the first telescopic rod has a first through hole, the movable part has a protrusion, and in the locked state, the protrusion extends out from the first through hole; and the main body is provided with a sleeve, the sleeve has a positioning part corresponding to the first through hole, and in the locked state, the protrusion is engaged with the positioning part, and the positioning part prevents the movable part from disengaging from the main body;

wherein the sleeve has a positioning through hole, in the locked state, the protrusion of the movable part extends out from the first through hole and the positioning through hole.

* * * * *